United States Patent [19]

Gajek et al.

[11] Patent Number: 5,358,078
[45] Date of Patent: Oct. 25, 1994

[54] HYDRAULICALLY-OPERABLE DISK BRAKE FOR BICYCLES OR SIMILAR VEHICLES

[75] Inventors: Joachim Gajek, Würzburg; Hannsjörg Stumpf, Schweinfurt, both of Fed. Rep. of Germany

[73] Assignee: Fichtel & Sachs AG, Schweinfurt, Fed. Rep. of Germany

[21] Appl. No.: 87,216

[22] Filed: Jul. 2, 1993

[30] Foreign Application Priority Data

Jul. 4, 1992 [DE] Fed. Rep. of Germany ....... 4222044

[51] Int. Cl.⁵ .................. F16D 55/18; F16D 55/02
[52] U.S. Cl. .................... 188/72.4; 188/26; 188/71.8
[58] Field of Search .............. 188/26, 71.7–71.9, 188/72.3, 72.4, 73.1, 250 R, 250 D, 250 G, 344

[56] References Cited

U.S. PATENT DOCUMENTS

| | | | |
|---|---|---|---|
| 3,497,036 | 2/1970 | Seip ........................ | 188/72.4 |
| 3,887,044 | 6/1975 | Burgdorf et al. ............. | 188/250 G |
| 4,076,106 | 2/1978 | Bermingham et al. ......... | 188/250 G |
| 4,375,842 | 3/1983 | Melinat .................... | 188/72.3 |
| 4,386,682 | 6/1983 | Woo et al. ................. | 188/72.3 |
| 4,412,603 | 11/1983 | Bischoff ................... | 188/72.4 |

FOREIGN PATENT DOCUMENTS

| | | | |
|---|---|---|---|
| 2229481 | 2/1973 | Fed. Rep. of Germany . | |
| 3325970 | 1/1985 | Fed. Rep. of Germany . | |
| 1227387 | 12/1959 | France ..................... | 188/71.8 |
| 0244933 | 10/1986 | Japan ...................... | 188/2646 |
| 1088200 | 10/1967 | United Kingdom ........... | 188/72.4 |

*Primary Examiner*—Robert J. Oberleitner
*Assistant Examiner*—Chris Schwartz
*Attorney, Agent, or Firm*—Brumbaugh, Graves, Donohue & Raymond

[57] ABSTRACT

In accordance with the invention, a hydraulic disk brake for bicycles is provided which includes a brake caliper 1, 101, a brake piston 8, 108, 208, and a guide cylinder 2, with the aid of which the brake system can be pre-adjusted in a coarse manner with respect to the bicycle frame. The total clearance (=2×"s"), of the brake linings 18a, 18b is capable of pre-adjustment. The central position of the brake caliber 1, with respect to the brake disk 21, can be adjusted via an adjusting screw 22. The brake is arranged for constant, equal clearance on both sides of the brake disk 21 in the unstressed condition of the brake, such clearance being ensured on the basis of the spring-action, pre-tensioning of the brake piston 8, 108, 208, with respect to the brake caliper 1, as well as of the spring-action pre-tensioning of the brake caliper 1, 101 with respect to the guide cylinder 2.

19 Claims, 3 Drawing Sheets

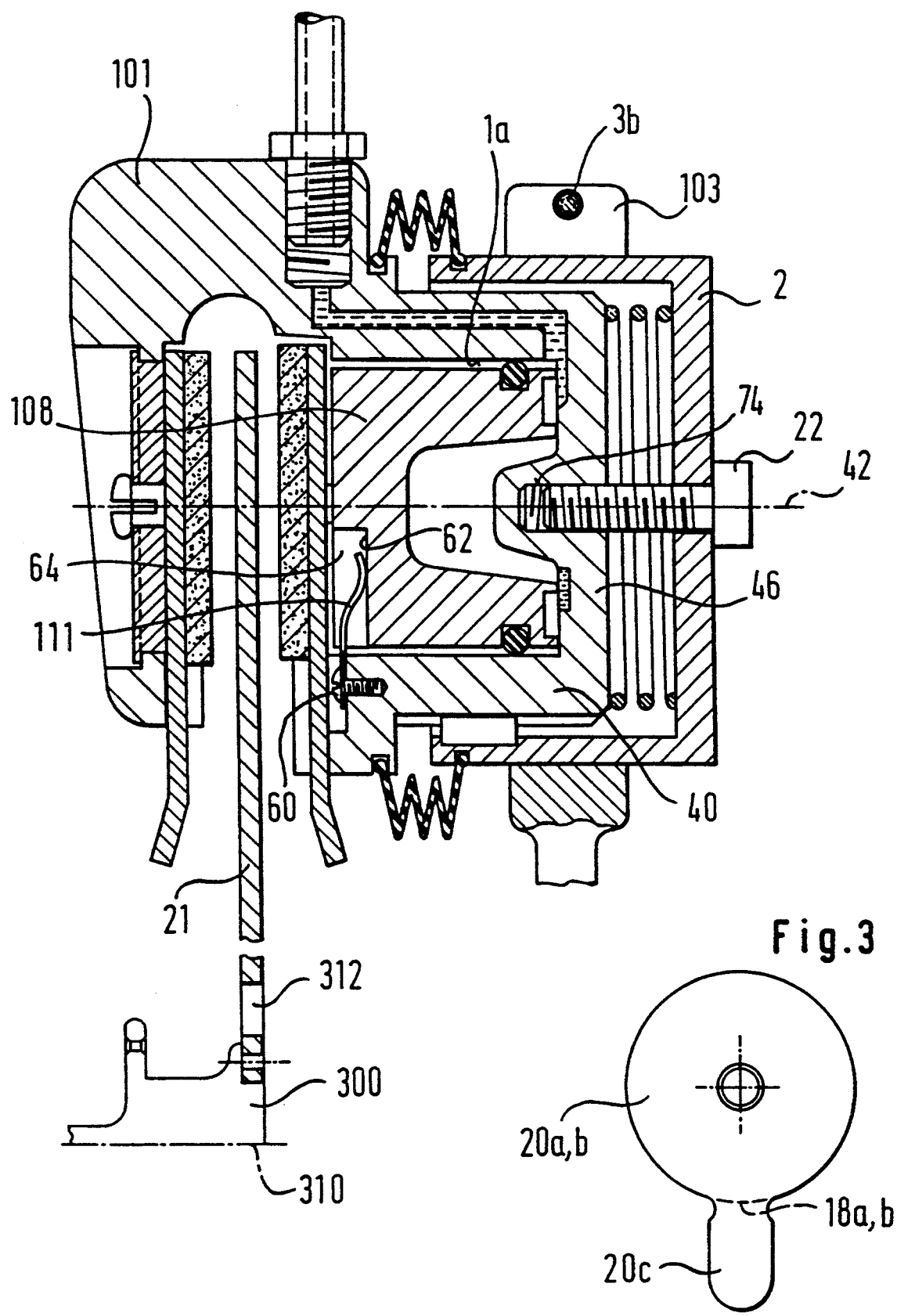

HYDRAULICALLY-OPERABLE DISK BRAKE FOR BICYCLES OR SIMILAR VEHICLES

BACKGROUND OF THE INVENTION

The invention concerns a hydraulically-operable disk brake for bicycles or similar vehicles.

In the construction of automotive vehicles and motorcycles, hydraulically-operable disk brakes have been widely adopted. In bicycles, they are not as yet in use. A disk brake for bicycles in a mechanical design is known from DE 22 29 481 C3. In this case, the caliper is mounted on the frame in a manner capable of being shifted via two head screws that penetrate through appropriate holes in the frame, wherein rubber disks encircling the screws between the caliper and the frame ensure a pretensioning into an initial position. By means of an appropriate adjustment of the fastening screws, the position of the caliper with respect to the brake disk can be adjusted in a direction parallel to the axis in order to thereby equalize the distances between the brake linings and the brake disk. The operation is carried out mechanically via a rope and pulley arrangement which engages an operating lever. The operating lever is moved back into its initial position via a return spring. Such a mechanically operable disk brake requires high operating forces, in particular because of the high frictional resistances on the force path. Furthermore, there arise problems of adjustment because of the plurality of parts, which problems may be attributed to the aggregate manufacturing tolerances within the operating mechanism. The distance between brake disk and brake-lining part in the initial position must be preadjusted so as to be relatively large. Furthermore, there necessarily appear instances of tilting, since the shifting axis determined by the two fastening screws is distant from the braking axis defined by the two brake linings, and thus necessarily there appear tilting moments during braking.

A hydraulically-operable bicycle brake is known from DE 33 25 970 A1. Here, however, the brake linings do not act upon a brake disk but instead directly upon the wheel rim. Due to the large diameter of the rim, the forces that appear during braking are relatively small. The press-on forces of the brake linings are accordingly relatively small, and the tilting moments that must necessarily appear, due to the double-arm lever construction, are also not excessively large. However, rim brakes have systemic disadvantages, such as, for example, the problem-beset performance of the brake in case of moisture as well as the limited choice of materials for the rim. For instance, there hardly exists a rubber formulation which will provide a satisfactory braking action in connection with chromium-plated steel rims. This presents a significant problem in practice, as such rims are commonly used, particularly in the case of inexpensive bicycles.

SUMMARY OF THE INVENTION

An object of the present invention is to provide a hydraulically-operable disk brake for bicycles which, with a simple construction, will permit a precise adjustment of the brake on the respective bicycle without the risk that, after release of the brake, one of the brake lining parts will drag against the brake disk.

This object is attained by a hydraulically-operable disk brake for bicycles or similar vehicles, which encompasses:

A brake disk which is capable of being connected to a wheel hub in a rotation-resistant manner, which wheel hub is mounted on a vehicle frame in a manner capable of rotation around a hub axis;

A brake caliper which is mounted on a carrier part connected to the vehicle frame in a manner that is shiftable in a direction that is substantially parallel to the hub axis; wherein the caliper is substantially U-shaped and is arranged with two lateral legs and one center leg connecting the two lateral legs straddling the disk brake, so that the disk brake runs between the two lateral legs;

A first brake-liner part, which is arranged in a stationary manner on one of the two lateral legs opposite the brake disk;

A second brake-liner part, which is arranged on the other of the two lateral legs opposite the brake disk;

A brake piston in a piston-accommodating opening adapted to the contour of the brake piston in the other lateral leg, on the side of the brake lining that faces away from the brake disk, which brake piston is mounted in a manner capable of being moved in a shifting direction which is substantially parallel to the hub axis between an initial position which is more distant from the brake disk and a braking position which is closer to the brake position; and which brake piston, in so doing, is guided in a sealing manner in the piston-accommodating opening; wherein the brake piston engages with one of its two front-sides the second brake-lining part and with its other front-side defines a pressurized-fluid chamber within the other lateral leg, to which pressurized-fluid chamber a supply line for pressurized fluid is connected for the simultaneous shifting of the brake piston and of the second brake-lining lining part in the direction of the braking position when pressurized fluid is supplied to the pressurized-fluid chamber;

First pre-tensioning means, acting between the brake piston and the caliber, which first pre-tensioning means elastically pre-tensions the brake piston into the initial end position;

Second pre-tensioning means, acting between the caliper and the carrier part, which second pre-tensioning means elastically pretensions the brake caliper into an initial end-position, in which initial end-position the one lateral leg that carries the first brake-lining part is at a maximum distance from the brake disk; and Adjustment means that act between the brake caliper and the carrier part for the optional adjustment of the initial end-position of the brake caliper in a manner such that in the initial end-position of the brake caliper—and simultaneously in the initial position of the brake piston—the distance between the brake disk and the first brake-liner part is equal to the distance between the brake disk and the second brake-liner part.

The adjusting means which act between the brake caliper and the carrier part permits a precise adjustment of the respective distances of the brake-lining parts from the brake disk. The first and second pre-tensioning means reposition the brake piston as well as the brake caliper into the respective starting positions in which, in the case of a proper adjustment via the above-mentioned adjusting means, a dragging of the brake disk against either of the two brake-lining parts is reliably prevented.

In a preferred embodiment of the invention, a mechanically stable mounting of the brake caliper on the carrier part, which in particular eliminates tilting of the brake caliper, is ensured by designing the carrier part in a substantially pot-shaped form with a pot bottom and a pot wall, and by providing on the other lateral leg a projection which accommodates the brake piston and which is supported in a shiftable manner in the pot-shaped carrier part.

In so doing, the possibility of tilting moments is eliminated from the outset, if—in accordance with a further embodiment of the invention—the pot-shaped carrier part, the projection, the piston-accommodating opening and the brake piston and arranged coaxially with each other.

Preferably, the adjusting means encompasses an adjusting screw with a screw head supported on the pot bottom and a threaded section threaded into an internal thread arranged in the projection. This adjusting screw fixes the initial end-position of the caliper since, if the brake is not operated, the adjusting screw is pretensioned by the second pre-tensioning means so that the screw head abuts against the pot bottom. In case of brake operation, with the corresponding shifting of the floatingly mounted brake caliper against the spring action of the second pre-tensioning means, the screw head momentarily lifts off the pot bottom.

The adjusting screw can be threaded either directly into the projection or into a screw element which serves to support the first pre-tensioning means in the form of a compression spring.

For the sake of simplicity, the second pre-tensioning means may be formed by a compression spring which is inserted between the projection and the pot bottom.

In those cases in which a change in the distance of the two brake-lining parts is required without the brake being operated (in particular, in the case of an optional adjustment to brake disks of different thicknesses), it is proposed that the further adjusting means encompass a set of stop disks of varying thicknesses of which at least one stop-disk each can be inserted between the other frontside of the brake piston and a bottom of the accommodating opening.

For the sake of simplicity, these further adjusting means may encompass a set of stop disks of varying thicknesses of which at least one is inserted into the disk brake, in accordance with the brake-disk thickness of the moment.

In order to make it possible for the brake linings to be replaced quickly and simply in case of need, the brake-lining parts are connected to the brake piston by means of releasable connections—preferably, snap-type fastener connections.

The first pre-tensioning means may take different modes of construction, such as, for instance, a leaf spring attached to the caliper, which leaf spring engages the brake piston, or a helical compression spring within an annular recess of the brake pistons, which spring is supported both by the brake piston and the brake caliper.

In order to fix the brake caliper on the pot-shaped carrier part in a rotation-resistant yet axially shiftable manner, a groove/spring-clip connection between the two parts is provided.

The fastening of the carrier part to the bicycle frame may be carried out via a clamping arrangement which permits an axial shifting of the carrier part, for the purpose of coarse adjustment. The fine adjustment can then be carried out via the adjusting means described above.

In order to make it possible to also carry out an angular adjustment if such is needed, the pot-shaped carrier part may be capable of connection with the bicycle frame via a clamping arrangement comprising a slit ring and a brake holder, the latter encircling the slit ring and being capable of being tensioned; through which arrangement it is possible to effect both an axial adjustment (by shifting the carrier part in the ring) and a swivel adjustment (by swiveling the brake holder via a spherical surface on the ring).

In order to prevent the penetration of moisture and dirt into the moving joint between the brake caliper and the pot-shaped carrier part, the brake joint may be sealed by means of an annular body made of rubber elastic material, preferably in the shape of a bellows or roll-type seal or cover.

In order to make it possible to replace the brakelining parts in a quick and simple manner, the brakelining parts each include a lining carrier carrying the brake lining, with a hand grip that protrudes laterally over the lateral legs of the caliper.

The various features of novelty which characterise the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is further described hereinbelow by reference to preferred embodiments thereto, as shown in the accompanying drawings, in which:

FIG. 2 is a sectional view corresponding to FIG. 1 with a return-spring variant for the brake piston;

FIG. 3 is a top view of a brake-lining carrier with a stem-type extension.

DETAILED DESCRIPTION OF A PREFERRED EMBODIMENT

Figure 1:
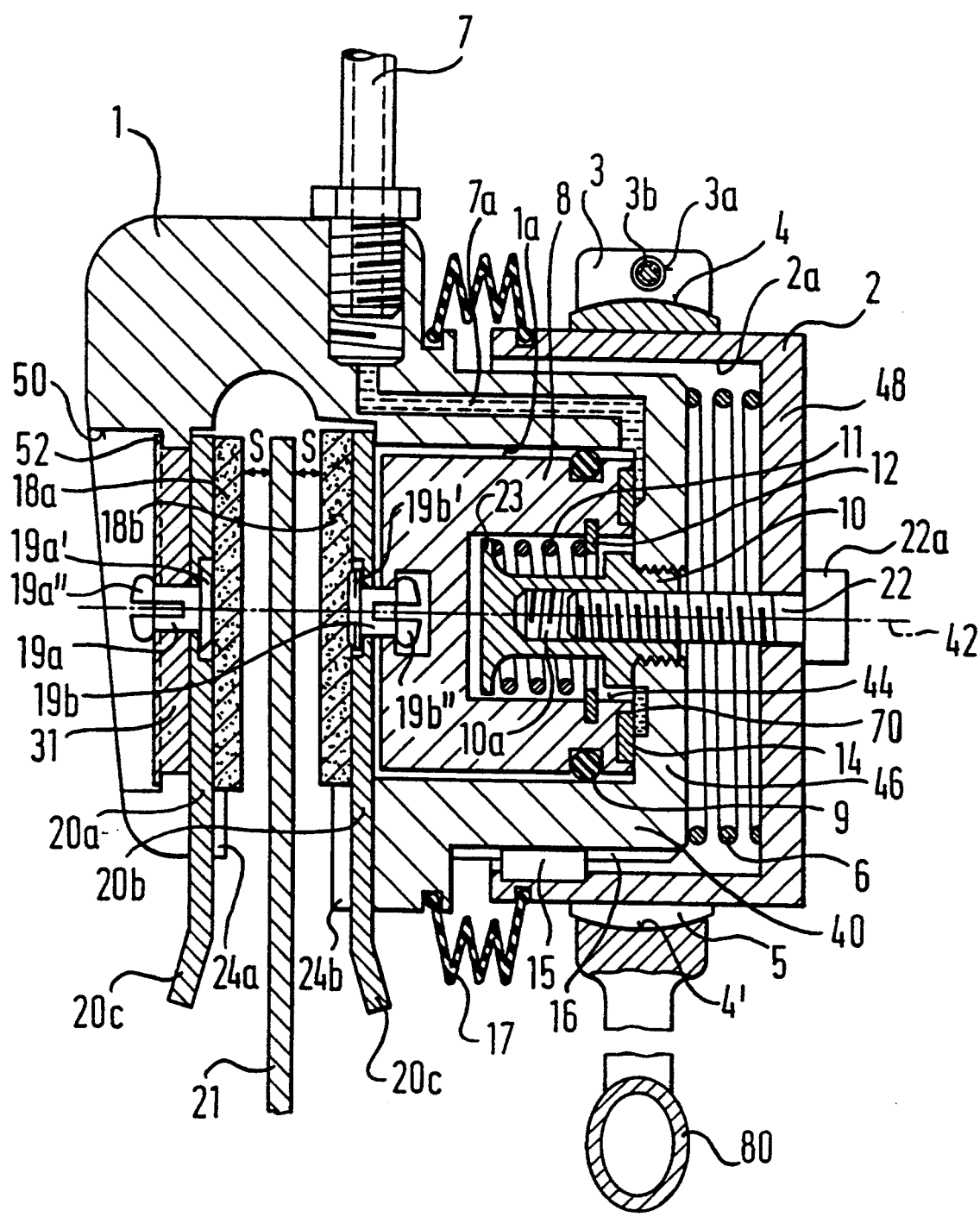
FIG. 1 is a sectional view through a disk brake and a disk caliper along a plane that contains both the axis of the brake piston and that of the brake disk, the latter being shown only in FIG. 2.

In a first embodiment shown in FIG. 1, the brake caliper 1 encloses in a pincer-like manner a brake disk 21, which, as shown in FIG. 2, is flanged onto a hub 300 of a bicycle. The hub axis which coincides with the brake-disk axis is designated by 310. Outside the brake caliper, the brake disk 21 can be provided with holes 312 for weight reduction purposes, as is also indicated in FIG. 2.

The brake caliper 1 straddles the outer edge of the brake disk 21 and for that purpose has a substantially U-shaped cross section. The right-hand lateral leg (as viewed in FIG. 1) of the U-shaped brake caliper 1 is constructed to accommodate a brake piston 8 by forming thereon a substantially cylindrical projection 40 with axis 42, which axis coincides with the piston axis. The piston 8 is arranged in a shiftable manner in a blind hole-type bore 1a in the projection 40, which blind hole is open towards the brake disk 21. Since the piston 8 is designed to transform hydraulic pressure into an axial force, an annular seal 9 is arranged in an appropriate external circumferential groove in the piston 8. This annular seal separates the chamber (in FIG. 1, to the right of the annular seal 9) filled with brake fluid, from the region of the brake arrangement that extends to the left of the annular seal 9 and is connected to the atmosphere.

In the initial position shown in FIG. 1, the brake piston 8 stops against the bottom of the blind-hole type bore 1a in the projection 40 under the effect of a spring 11. The spring 11 is located in a central bore 44 of the brake piston 8, which central bore is open towards the bottom of the bore 1a. At one end, the spring abuts against a retaining ring 12 which is fastened to the brake piston 8 by being inserted into an appropriate internal circumferential groove in the piston. At its other end, the spring 11 bears against a radially projecting collar 23 of a spring screw 10. The spring screw 10 is screwed into the bottom 46 of the blind hole-type bore 1a so as to establish a fluid-tight seal therewith. Because of this arrangement, the spring 11, designed as a helical compression-spring, is increasingly compressed when the piston 8 is shifted from its initial position towards the left (as viewed to FIG. 1). Since the spring 11 is pre-tensioned, the brake piston 8 is reliably biased to its initial position when the brake is not being operated. This ensures that a predetermined clearance "s" is maintained between the brake disk 21 and the brake lining 18b attached to the brake piston 8. On the opposite side of the brake disk 21, the same clearance "s" must result between the disk 21 and the other brake lining 18a in order to ensure the release of the brake disk 21—and therefore the release of the running wheel carrying the brake disk 21—without the temporary dragging of the brake disk 21 against either of the two brake linings 18a, 18b whenever the brake is not operated. In the case of bicycles and similar muscle-operated vehicles, any avoidable resistances must be unconditionally eliminated.

The requirement for an unconditional release of the brake disk if the brake is not operated also requires that provision be made for adjustment and/or shifting of the entire brake caliper 1 with respect to the brake disk 21 in order to enable the setting of the same clearance "s" between the two brake linings 18a and 18b and the brake disk 21. Because of manufacturing tolerances which are unavoidable in the case of a mass-produced bicycle, it is difficult, if not impossible, to achieve from the outset, after the bicycle has been assembled, the precise central positioning of the brake linings with respect to the brake disk.

For the central adjustability of the brake caliper i, the caliper 1 is inserted with its previously-mentioned projection 40 into a cylindrical bore 2a in a guide cylinder 2 rigidly connected to the vehicle frame 80, which cylindrical bore 2a conforms generally to the cross-sectional shape of projection 40. The bore 2a axis also coincides with the previously-mentioned axis 42. Between the bottom 46 of the blind-hole type bore 1a in the projection 40 and the bottom 48 of the guide cylinder 2 lies a pre-tensioned helical compression spring 6 which biases the caliper 1 outwardly of the bore 2a. This movement is stopped by an adjusting screw 22 which protrudes centrally from the outside through the bottom 48 of the guide cylinder 2 and is rigidly connected to the bottom 46 of the projection 40 via the previously-mentioned spring screw 10 which is screwed to the bottom 46. This is accomplished by threading the adjusting screw 22 into a blind hole 10a of the spring screw 10, which blind hole is provided with an internal thread.

The guide cylinder 2 is connected with the bicycle frame 80 via a slit ring 5, which slit ring is clamped together with an annular brake holder 3, also slit, by means of a locking screw 35 which engages into a bore 3a in the brake holder 3, the clamping being achieved by drawing the ring ends together. The guide cylinder 2 can be axially shifted within the ring 5 for an appropriate coarse adjustment. Since the ring 5 and the brake holder 3 lie against each other via complementary spherical surfaces 4, 4', an angular adjustment of the guide cylinder 2 and the ring 5 within the ring 3 can also be carried out. In this fashion, any misalignment between the hub axis 310 of the running wheel and the axis 42 of the brake piston 8 can be eliminated.

In many cases it is possible to do without an angular adjustment. The ring 5 can then be omitted. As indicated in FIG. 2, in that case a brake holder 103—once again in the shape of a slit ring—can then directly engage the cylindrical outer perimeter of the guide cylinder 2. After the cylinder 2 and the brake holder 103 have been axially shifted with respect to each other for the purpose of a coarse adjustment, the brake holder 103 is clamped by tightening the respective fastening screw 3b.

A spring clip 15 is fixed in the bore 2a of the guide cylinder 2 and is axially shiftable in a groove 16 on the outer periphery of the projection 40 of the brake caliper 1, which groove 16 runs parallel to the axis 42. In this manner, rotational movement of the brake caliper 1 relative to the guide cylinder 2 is prevented while relative axial shifting movement is permitted.

Fine adjustment of the position of the brake linings 18a and 18b symmetrically relative to the brake disk 21 which lies between them is carried out via the adjusting screw 22. For that purpose, the spring 6 ensures that the spring head 22a of the adjusting screw 22 always bears against the bottom 48 of the guide cylinder 2 whenever the brake is not operated.

The entire clearance (=2×"s") is maintained by the brake manufacturer via the appropriately precise maintenance of manufacturing tolerances as a rule; however, if for some reason (for instance, if brake disks 21 of different thicknesses are used) it is necessary to change the total clearance, this can be accomplished by inserting a spacer ring 14 of optional thickness as a stop between the brake piston 8 and the bottom 46 of the projection 40 of the brake caliper 1. As shown in FIG. 1, the spacer ring 14 can be inserted into a front-side groove of the brake piston 8, in which case the ring projects to a greater or lesser extent beyond the piston front-side, depending on the desired total clearance (=2×"s").

The brake caliper 1 and the guide cylinder 2 are protected against the penetration of dirt in the region between the projection 40 and the bore 2a by means of an elastic ring seal 17. This ring seal may be designed as a bellows-type or roll-type seal or cover in order not to constrain in any significant way the movement of the two parts.

The brake lining 18b must accompany all axial movements of the brake piston 8, for which purpose it is coupled to it, preferably via a snap connection. In the embodiment of FIG. 1, this snap connection is achieved via a fastening rivet 19b, whose head 19b' is immobilized between a lining carrier 20b and the actual brake-lining part 18b. The stem 19b″ of the rivet is axially slit so that it can be pressed in a spring-like manner into a T-shaped opening in the front-side of the brake piston 8, which front-side faces the brake disk. In this manner, the brake lining 18b is held in a definite position, both with respect to the brake piston 8 and—in the initial position of the brake piston 8—with respect to the brake caliper 1.

The other brake lining 18a is fastened in a corresponding manner with a like-shaped fastening-rivet 19a to the left-hand (in FIG. 1) lateral leg of the U-shaped brake caliper 1. The rivet head 19a′ is in turn fixed between the brake-lining part 18a and a brake lining carrier 20a. The slit stem 19a″ is inserted through an opening of a disk 31, which is inserted into a stepwise recess 50 of the brake caliper, wherein a disk edge 52, protruding radially outwards, lies against a radial step-type surface of the recess 50 in such a way as to serve as an abutment and to maintain the brake lining 18a in the prescribed position on the brake caliber 1.

In order to prevent the braking linings 18a and 18b from twist—but also in order to simplify assembly and disassembly—the above-mentioned lining carriers 20a and 20b have the approximate shape of a frying pan with a handle (see FIG. 3). The handle 20c is accessible from the outside, as seen in FIGS. 1 and 2, and facilitates maintenance work. In order to prevent twisting and/or shifting with respect to the brake caliper 1, the handles 20c of the two lining carriers 20a and 20b each lie in geometrically true fashion between two flanks 24a and/or 24b against the inner sides of the two lateral legs of the U-shaped brake caliper 1. The two lining-carriers 20a and 20b, as well as their brake linings 18a and 18b, together with the fastening rivets 19a and 19b are respectively identical and therefore exchangeable without any difficulty.

Figure 4:
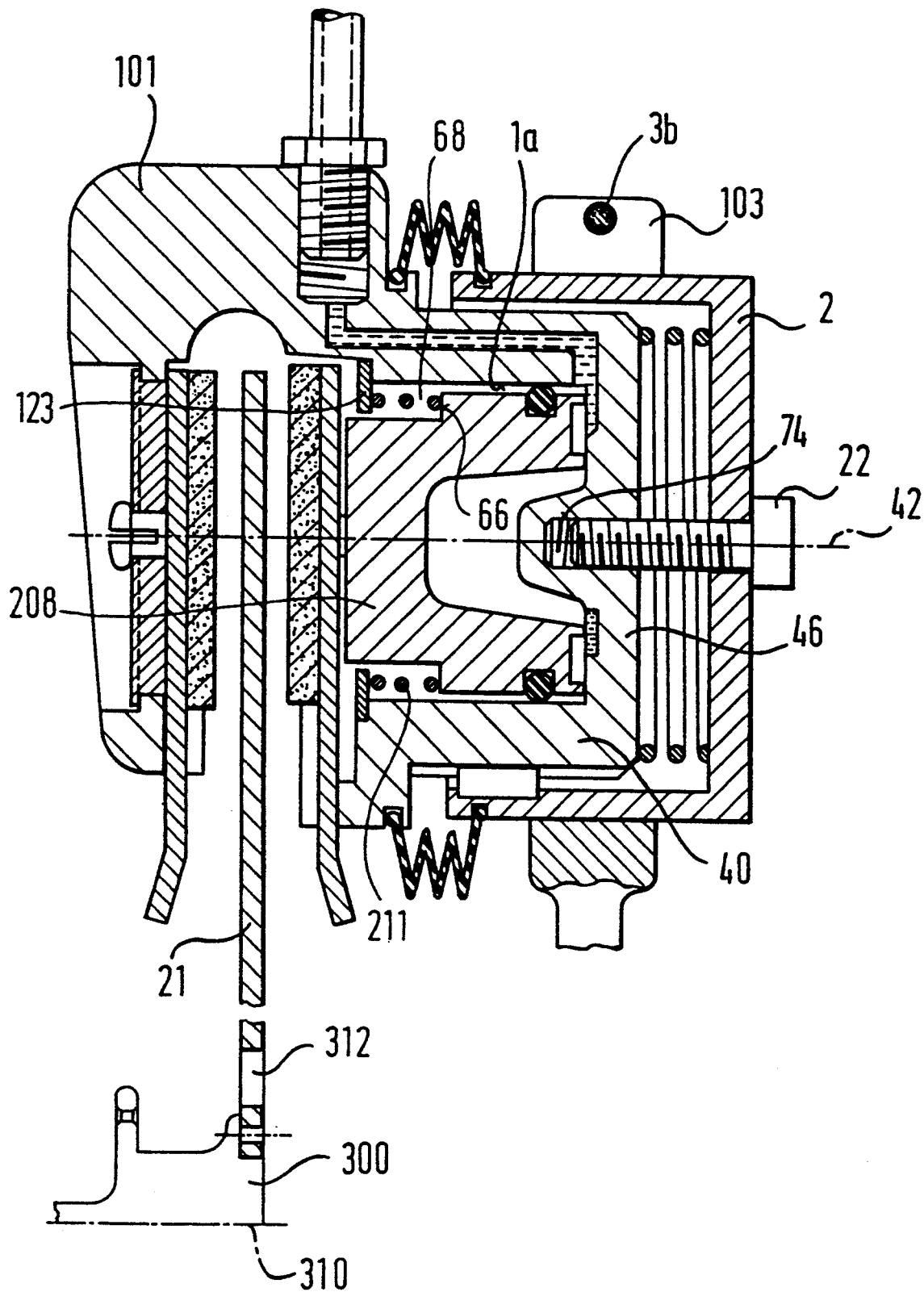
FIG. 4 is a sectional view corresponding to FIG. 2 with a further return-spring variant for the brake piston.

The spring-action pre-tensioning of the brake piston 8 can be modified in accordance with FIGS. 2 and 4. In the embodiment of FIG. 2 a leaf spring 111 is attached to the brake caliper 101 by means of a screw 60, wherein the free end of the spring pushes against an abutting surface of the brake piston 108 facing the brake disk 21. In order not to increase the axial length of the arrangement, the leaf spring 111 can be inserted into a corresponding recess 64 on the front-side of the brake piston 108.

A second variant is shown in FIG. 4. In this embodiment, the brake piston 208 is pre-tensioned into the initial position by a helical spring 211. This spring is supported with its right-hand (in FIG. 4) end on a radial step-type surface 66 on the external periphery of the brake piston 208. At its other end, the spring 211 is supported on a retaining ring 123 which is fixed to the brake caliper 101 and protrudes radially inward therefore, such that the retaining ring 123 and the spring 211 encircle the piston 208 in ring-like fashion. In order to once again keep at a minimum the required mounting space, the spring 211 can be arranged in an annular space 68 which is formed by a reduced-diameter section at the left-hand (in FIG. 4) end of the brake piston 208 and which is limited radially outwardly by the cylindrical bore 1a in the brake caliper 101. This arrangement has the advantage that whatever modifications are necessary can be produced at no extra cost while the brake piston 208 and the brake caliper 101 are turned on lathes.

If fluid pressure is produced by a control cylinder (not shown) by operating the brake hand lever on the handlebars of the bicycle, this fluid pressure is supplied via a pressure line 7 (FIG. 1) to an internal supply line 7a in the brake caliper 1, 101 and finally to an operating chamber 70 between the right-hand (in FIGS. 1 and 2) front-side of the brake piston 8, 108, 208 and the bottom 46 of the projection 40 of the brake caliper 1. The rising pressure on the front-side of the brake piston causes the brake piston 8, 108, 208 to shift towards the left (in FIGS. 1 and 2) against the resistance of the spring 11, 111,211. Consequently, the brake lining 18b is brought into abutment against the brake disk 21. A further pushing-out of the brake piston 8, 108, 208 leftward with respect to the brake caliper 1 (in FIGS. 1 and 2), leads, due to a corresponding reactive force of the brake disk 1, to the shifting of the brake caliper 1, 101 in the opposite direction (to the right in FIGS. 1 and 2) until the brake lining 18a also abuts against the brake disk 21 with the same force as the brake lining 18b. In other words, in this movement the brake caliper 1, 101 shifts with respect to the guide cylinder 2 (which is fixed to the bicycle frame), whereby the brake caliper 1, 101 further compresses the spring 6 which is under pressure and whereby the brake caliper 1, 101 shifts the head 22a of the adjusting screw 22 in an outwardly direction away from its abutting position against the guide cylinder 2. Both brake linings 18a and 18b are thus brought to bear against the brake disk 21. If the brake-fluid pressure is appropriately raised, an appropriately high brake force is obtained, which force causes a rapid braking of the rotating brake disk 22, and hence of the running wheel.

If the brake handle (not shown) is released, the brake-fluid pressure promptly drops. Because of the return action of the spring 11, 111, 211, the brake piston 8, 108, 208 is thereupon moved back into its initial position in which it abuts against the bottom 46. At the same time, the spring 6 pushes the brake caliber 1, 101 back into its initial position in which the head 22a of the adjusting screw 22 abuts against the bottom 48 of the guide cylinder 2. As explained at the outset, both abutting positions are adjusted so that now the same clearance "s" prevails between the brake disk 21 and the two brake linings 18a and 18b. In this manner, any dragging of the brake disk 21 against either of the brake linings 18a and 18b is reliably prevented, a fact which is of particular importance in the case of a bicycle or other muscle-driven vehicles. Furthermore, the corresponding frictional noises are eliminated.

In connection with the embodiments of FIG. 2 and 4, it should be furthermore noted that the spring screw 10, which is there threaded in a sealing manner into the bottom 46 of the projection 40, can be eliminated. In other words, the adjusting screw 22 can be threaded directly into a threaded blind-hole 74 that is open to the right (in FIG. 2) in the bottom 46 of the projection 40. In this manner, any possible sealing problems associated with the spring screw 10 are avoided.

In accordance with the invention, a hydraulic disk brake for bicycles is provided, including a brake caliper 1, 101, a brake piston 8, 108, 208, and a guide cylinder 2, with the aid of which the brake system can be preadjusted in a coarse manner with respect to the bicycle frame. The total clearance (=2×"s") of the brake linings 18a, 18b is capable of pre-adjustment. The central position of the brake caliper 1 with respect to the brake disk 21 can be produced via an adjusting screw 22. The brake is arranged for constant, equal clearance on both sides of the brake disk 21 in the unstressed condition of the brake, such clearance being ensured on the basis of the spring-action, pre-tensioning of the brake piston 8, 108, 208, with respect to the brake caliper 1, as well as of the spring-action pre-tensioning of the brake caliper 1, 101 with respect to the guide cylinder 2.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A combination of an hydraulically-operable disk brake and a vehicle frame (80) having a wheel hub (300), comprising:
   a brake disk (21) adapted to be connected to the wheel hub (300) for rotation therewith around the hub axis (310);
   a substantially U-shaped brake caliper (1; 101) having two lateral legs and a central part that connects the two lateral legs;
   means, including a guide cylinder (2), for mounting the brake caliper (1; 101) on the vehicle frame (80) such that the two lateral legs straddle the brake disk (21) and the brake disk (21) runs therebetween and such that the brake caliper (1; 101) is shiftable in a direction that is substantially parallel to the hub axis (310);
   a first brake-lining part carried in a stationary manner opposite the brake disk (21) on one of the two lateral legs;
   a second brake-lining part carried opposite the brake disk (21) on the other of the two lateral legs;
   a piston-accommodating opening (1a) in the side of the other lateral leg facing away from the brake disk (21);
   a brake piston (8; 108; 208) mounted in the opening (1a) so as to move, in a shift direction that is substantially parallel to the hub axis (310), between an initial end-position that is more distant from the brake disk (21) and a braking position that is located closer to the brake disk (21);
   means for establishing a fluid-tight seal between the brake piston (8; 108; 208) and the piston-accommodating opening (1a) throughout said movement;
   the brake piston (8; 108;208) having two front-sides, one of the front sides having a T-shaped opening engaging the second brake-lining part and the other front-side limiting a pressurized fluid chamber (70) within the other lateral leg;
   a supply line (7,7a) for pressurized fluid connected to the pressurized fluid chamber (70) for the simultaneous shifting of the brake piston (8; 108; 208) and the second brake-lining part in the direction of the braking position when pressurized fluid is supplied to the pressurized-fluid chamber (70);
   first pre-tensioning means (11; 111; 211), acting between the brake piston (8) and the brake caliper (1) for elastically pre-tensioning the brake piston (8; 108; 208) into the initial end-position;
   second pre-tensioning means (6), acting between the brake caliper (1; 101) and the guide cylinder (2), for elastically pre-tensioning the brake caliper (1; 101) into an initial end-position in which the one lateral leg that carries the first brake-lining part is spaced a maximum distance from the brake disk (21), the guide cylinder (2) being substantially pot-shaped, with a pot bottom (48) and a pot wall, the other lateral leg of the brake caliper (1) carries a projection (40) that receives the brake piston (8; 108.; 208), which projection (40) is mounted in a shiftable manner in the pot-shaped guide cylinder (2); and
   adjusting means (22), acting between the brake caliper (1; 101) and the guide cylinder, for the optional adjustment of the initial end-position of the brake caliper (1; 101) in a manner such that in the initial end-position of the brake caliper (1) and simultaneously in the initial position of the brake piston (8), the distance ("s") between the brake disk (21) and the first brake-lining part is equal to the distance ("s") between the brake disk (21) and the second brake-lining part.

2. The disk brake according to claim 1, wherein the pot-shaped guide cylinder (2), the projection (40), the piston-accommodating opening (1a) and the brake piston (8) are arranged in coaxial alignment to one another about a common axis (42).

3. The disk brake according to claim 1 or 2, wherein the adjusting means comprises an adjusting screw (22) having a screw head (22a) which bears against the pot bottom (4a) and a threaded section which is threaded into an internal thread (10a) that is arranged in the projection (40).

4. The disk brake according to claim 3, wherein the internal thread (10a) is formed in a threaded element (10) which is threaded into the projection (40) of the other lateral leg and reaches into the piston-accommodating opening (1a) so as to secure the first pre-tensioning means.

5. The disk brake according to claim 4, wherein:
   the threaded element (10) includes a radially extending collar (23);
   a retaining ring (12) is attached to the brake piston (7); and
   a compression spring (11) is interposed between the collar (23) and the retaining ring (12) for the purpose of pre-tensioning the brake piston (8) to the initial end-position.

6. The disk brake according to claim 1, wherein further means of adjustment are provided between the brake piston (8; 108; 208) and the brake caliper (1; 101) for the optional adjustment of the initial end-position of the brake piston (8; 108; 208).

7. The disk brake according claim 6, wherein the further means of adjustment includes:
   at least one stop disk (14) inserted between the other front-side of the brake piston (8) and the bottom (46) of the accommodating opening (1a); and
   means for permitting the replacement of said at least one stop disk (14) with another stop disk of a different thickness to adjust the spacing between the brake piston (8) and the bottom (46).

8. The disk brake according to claim 1, wherein:
   the first brake-lining part is attached to the brake caliper (1; 101) by a releasable connection; and
   the second brake-lining part is attached to the brake piston (8) by a releasable connection.

9. The disk brake according to claim 8, wherein the releasable connection is formed in each case by a snap-fastener type connection (19a, 19b).

10. The disk brake according to claim 1, further comprising means (15; 16) carried by the projection (40) of the other lateral leg of the brake caliper (1) and the pot-shaped guide cylinder (2) for preventing relative rotation therebetween but permitting linear shifting movement therebetween in a direction substantially parallel to the hub axis (310).

11. The disk brake according to claim 10, wherein said means carried by the projection (40) and the other leg of the brake caliper (1) includes a groove (16) on the projection (40) and a spring member (15) on the other lateral leg of the brake caliper (1) which engages the groove (16) in an axial sliding relation.

12. The disk brake according to claim 1, wherein a ring body made of elastic material (17) seals a moving joint between the brake caliper (1; 101) and the pot-shaped guide cylinder (2).

13. The disk brake according to claim 12, wherein the ring body (17) is formed by a bellows-type or roll-type seal.

14. The disk brake according to claim 1, wherein the second pre-tensioning means includes a compression spring (6) which is interposed between projection (40) and the pot bottom (48).

15. The disk brake according to claim 1, wherein the guide cylinder (2) is connected to the vehicle frame via a clamping arrangement (3, 5; 103), which clamping arrangement permits an axial shifting of the guide cylinder (2) for the purpose of coarse adjustment.

16. The disk brake according to claim 1, wherein the pot-shaped guide cylinder (2) is connected to the vehicle frame (80) via a clamping arrangement that comprises a slit ring (5) and a brake holder (3) capable of being tensioned that encircles the slit ring (5), via which clamping arrangement it is possible to achieve both an axial adjustment, by shifting the guide cylinder (2) in ring (5), and a swivel adjustment, by swiveling of the brake holder (3) via a spherical surface (4) on the ring (5).

17. The disk brake according to claim 1, wherein each brake-lining part includes a lining carrier (20a, 20b) with a hand grip (20c), which lining carrier carries a brake lining (18a, 18b), wherein the hand grip (20c) protrudes laterally over the lateral leg of the brake caliper (1).

18. A combination of an hydraulically-operable disk brake and a vehicle frame (80) having a wheel hub (300), comprising:
a brake disk (21) adapted to be connected to the wheel hub (300) for rotation therewith around the hub axis (310);
a substantially U-shaped brake caliper (1; 101) having two lateral legs and a central part that connects the two lateral legs;
means, including a guide cylinder (2), for mounting the brake caliper (1; 101) on the vehicle frame (80) such that the two lateral legs straddle the brake disk (21) and the brake disk (21) runs therebetween and such that the brake caliper (1; 101) is shiftable in a direction that is substantially parallel to the hub axis (310);
a first brake-lining part carried in a stationary manner opposite the brake disk (21) on one of the two lateral legs;
a second brake-lining part carried opposite the brake disk (21) on the other of the two lateral legs;
a piston-accommodating opening (1a) in the side of the other lateral leg facing away from the brake disk (21);
a brake piston (8; 108; 208) mounted in the opening (1a) so as to move, in a shift direction that is substantially parallel to the hub axis (310), between an initial end-position that is more distant from the brake disk (21) and a braking position that is located closer to the brake disk (21);
means for establishing a fluid-tight seal between the brake piston (8; 108; 208) and the piston-accommodating opening (1a) throughout said movement;
the brake piston (8; 108;208) having two front-sides, one of the front-sides having a T-shaped opening engaging the second brake-lining part and the other front-side limiting a pressurized fluid chamber (70) within the other lateral leg;
a leaf spring (111) attached to the brake caliper (101) which engages the brake piston (108) so as to pre-tension the brake piston (108) to its initial end position;
a supply line (7,7a) for pressurized fluid connected to the pressurized fluid chamber (70) for the simultaneous shifting of the brake piston (8; 108; 208) and the second brake-lining part in the direction of the braking position when pressurized fluid is supplied to the pressurized-fluid chamber (70);
first pre-tensioning means (11; 111; 211), acting between the brake piston (8) and the brake caliper (1) for elastically pre-tensioning the brake piston (8; 108; 208) into the initial end-position;
second pre-tensioning means (6), acting between the brake caliper (1; 101) and the guide cylinder (2), for elastically pre-tensioning the brake caliper (1; 101) into an initial end-position in which the one lateral leg that carries the first brake-lining part is spaced a maximum distance from the brake disk (21); and
adjusting means (22), acting between the brake caliper (1; 101) and the guide cylinder, for the optional adjustment of the initial end-position of the brake caliper (1; 101) in a manner such that in the initial end-position of the brake caliper (1) and simultaneously in the initial position of the brake piston (8), the distance ("s") between the brake disk (21) and the first brake-lining part is equal to the distance ("s") between the brake disk (21) and the second brake-lining part.

19. A combination of an hydraulically-operable disk brake and a vehicle frame (80) having a wheel hub (300), comprising:
a brake disk (21) adapted to be connected to the wheel hub (300) for rotation therewith around the hub axis (310);
a substantially U-shaped brake caliper (1; 101) having two lateral legs and a central part that connects the two lateral legs;
means, including a guide cylinder (2), for mounting the brake caliper (1; 101) on the vehicle frame (80) such that the two lateral legs straddle the brake disk (21) and the brake disk (21) runs therebetween and such that the brake caliper (1; 101) is shiftable in a direction that is substantially parallel to the hub axis (310);
a first brake-lining part carried in a stationary manner opposite the brake disk (21) on one of the two lateral legs;
a second brake-lining part carried opposite the brake disk (21) on the other of the two lateral legs;
a piston-accommodating opening (1a) in the side of the other lateral leg facing away from the brake disk (21);
a brake piston (8; 108; 208) mounted in the opening (1a) so as to move, in a shift direction that is substantially parallel to the hub axis (310), between an initial end-position that is more distant from the brake disk (21) and a braking position that is located closer to the brake disk (21);

means for establishing a fluid-tight seal between the brake piston (8; 108; 208) and the piston-accommodating opening (1a) throughout said movement;

the brake piston (8; 108;208) having two front-sides, one of the front-sides having a T-shaped opening engaging the second brake-lining part and the other front-side limiting a pressurized fluid chamber (70) within the other lateral leg;

a supply line (7,7a) for pressurized fluid connected to the pressurized fluid chamber (70) for the simultaneous shifting of the brake piston (8; 108; 208) and the second brake-lining part in the direction of the braking position when pressurized fluid is supplied to the pressurized-fluid chamber (70);

first pre-tensioning means (11; 111; 211), acting between the brake piston (8) and the brake caliper (1) for elastically pre-tensioning the brake piston (8; 108; 208) into the initial end-position;

the first pre-tensioning means comprises a helical compression spring (211) arranged in an annular recess (6a) of the brake piston (208), said helical compression spring is supported at one of its ends by a radial stepwise surface (66) on the external periphery of the brake piston (208) and at its other end by a retaining ring (123) which is mounted in the piston-accommodating opening (1a), so as to pre-tension the brake piston (108) to its initial end position;

second pre-tensioning means (6), acting between the brake caliper (1; 101) and the guide cylinder (2), for elastically pre-tensioning the brake caliper (1; 101) into an initial end-position in which the one lateral leg that carries the first brake-lining part is spaced a maximum distance from the brake disk (21); and adjusting means (22), acting between the brake caliper (1; 101) and the guide cylinder, for the optional adjustment of the initial end-position of the brake caliper (1; 101) in a manner such that in the initial end-position of the brake caliper (1) and simultaneously in the initial position of the brake piston (8), the distance ("s") between the brake disk (21) and the first brake-lining part is equal to the distance ("s") between the brake disk (21) and the second brake-lining part.

* * * * *

UNITED STATES PATENT AND TRADEMARK OFFICE
CERTIFICATE OF CORRECTION

PATENT NO. : 5,358,078
DATED : October 25, 1994
INVENTOR(S) : Joachim Gajek and Hannsjörg Stumpf It is certified that error appears in the above-indentified patent and that said Letters Patent is hereby corrected as shown below:

Col. 2, line 30, "brake position" should read --brake disk--;
Col. 2, line 40, "lining part" should read --part--;
Col. 2, line 44, "caliber" should read --caliper--;
Col. 3, line 16, "and arranged" should read --are arranged--;
Col. 6, line 8, "screw 35" should read --screw 3b--;
Col. 8, line 36, "caliber" should read --caliper--;
Col. 8, line 64, "caliber" should read --caliper--;
Col. 10, line 48, "according" should read --according to--.

Signed and Sealed this

Twenty-eight Day of March, 1995

Attest:

BRUCE LEHMAN

Attesting Officer

Commissioner of Patents and Trademarks